United States Patent [19]
Younes et al.

[11] Patent Number: 6,022,903
[45] Date of Patent: Feb. 8, 2000

[54] PERMANENT GAS BLOWN MICROCELLULAR POLYURETHANE ELASTOMERS

[75] Inventors: Usama E. Younes, West Chester, Pa.; Gary L. Allen, Winfield; Nigel Barksby, Dunbar, both of W. Va.

[73] Assignee: Arco Chemical Technology L.P., Greenville, Del.

[21] Appl. No.: 09/112,573

[22] Filed: Jul. 9, 1998

[51] Int. Cl.[7] .................................................. C08G 18/10
[52] U.S. Cl. .......................... 521/133; 521/159; 521/174; 521/176
[58] Field of Search .................... 521/159, 174, 521/176, 133

[56] References Cited

U.S. PATENT DOCUMENTS

| | | |
|---|---|---|
| 5,158,922 | 10/1992 | Hinney et al. . |
| 5,470,813 | 11/1995 | Le-Khac . |
| 5,482,908 | 1/1996 | Le-Khac . |
| 5,545,601 | 8/1996 | Le-Khac . |
| 5,689,012 | 11/1997 | Pazos et al. . |

OTHER PUBLICATIONS

ASTM D–2849–69, Standard Methods of Testing of Urethane Foam Polyol Raw Materials, pp. 913–931.

*Primary Examiner*—Rachel Gorr
*Attorney, Agent, or Firm*—Brooks & Kushman P.C.

[57] ABSTRACT

Microcellular polyurethane elastomers having sharply reduced or virtually no urea linkages may be prepared without resort to organic physical blowing agents by frothing a frothable mixture containing isocyanate reactive polyols and chain extenders, and a frothable isocyanate component. The isocyanate component is derived by reacting a stoichiometric excess of a di- or polyisocyanate with a polyol component containing an ultra-low unsaturation polyol. The froth-produced elastomers surprisingly exhibit greatly improved tear strengths, compression set, and other physical properties as compared to all water-blown microcellular elastomers of the same density.

26 Claims, No Drawings

PERMANENT GAS BLOWN MICROCELLULAR POLYURETHANE ELASTOMERS

TECHNOLOGICAL FIELD

The present invention pertains to frothed microcellular polyurethane elastomers. More particularly, the present invention pertains to microcellular polyurethane elastomers prepared from low unsaturation polyoxyalkylene polyethers, and frothed with permanent gases. These microcellular elastomers are well suited for use as shoe sole components.

DESCRIPTION OF THE RELATED ART

Microcellular polyurethane elastomers have numerous uses, for example as energy absorbing bumpers, automotive components such as head restraints and armrests, and in particular as shoe sole components. Prior to the Montreal protocol, it was possible to utilize volatile halocarbons such as CFC-11, CFC-22, methylene chloride, and the like as blowing agents to provide the numerous very fine cells characteristic of microcellular elastomers. However, the severe limitations placed on the use of halogenated hydrocarbons, and the increasing environmental concerns relative to the use of even the more environmentally friendly organic blowing agents has necessitated the development of water-blown microcellular elastomers.

In water-blown polyurethane microcellular elastomers, water present in the formulation reacts with a portion of the isocyanate component to generate an amine and carbon dioxide. The carbon dioxide serves as the blowing agent. However, the amine generated reacts with further isocyanate to produce urea linkages. The microcellular elastomer thus produced is not a polyurethane elastomer, but a polyurethane/urea elastomer containing substantial hard segment urea linkages. Such elastomers frequently are harder and less resilient than their all polyurethane counterparts. More importantly, however, the tear strength of such elastomers is limited. Tear strength is particularly important in applications such as those in the footwear industry.

Polyurethane flexible foams have been air frothed for use in carpet backing and carpet underlay applications. However, such foams are not microcellular. The cell size is quite large, as evidenced by the much lower density of these foams, i.e. from about 0.015 g/cm$^3$ to about 0.09 g/cm$^3$, and the systems are highly filled to increase the load bearing capacity. The large cell sizes required of these foams coupled with the use of doctor blades and the like to regulate foam height results in a considerable degree of collapse of the cells. Contributing to both the large cell size as well as the propensity for these cells to collapse is the relatively low viscosity of these flexible foam frothed systems. Collapse cannot be tolerated in molded microcellular elastomers, and the formulations employed in frothed carpet underlay are not suitable for microcellular elastomers.

It would be desirable to provide microcellular elastomers containing exclusively urethane linkages, or substantially all urethane linkages with only a most minor quantity of urea linkages, without the use of volatile organic blowing agents. It would be further desirable to provide polyurethane microcellular elastomers exhibiting improved tear strength relative to water-blown polyurethane/urea microcellular elastomers of similar density.

SUMMARY OF THE INVENTION

The present invention pertains to frothed microcellular elastomers prepared by frothing the principle reactive polyurethane-forming ingredients with a non-organic permanent gas in the presence of a frothing surfactant; and to frothed polyurethane/urea microcellular elastomers having much lower urea group contents than comparable water blown polyurethane/urea microcellular elastomers. The A- and B-sides of the formulation may be separately frothed and the two froths combined and processed appropriately. The resulting polyurethane and polyurethane/urea microcellular elastomers have surprisingly improved tear strength s when a substantial portion of the polyoxypropylene polyol portion of an isocyanate-terminated prepolymer used to prepare the elastomers is a low unsaturation polyoxypropylene polyol.

DESCRIPTION OF THE PREFERRED EMBODIMENTS

The microcellular polyurethane elastomers of the subject invention are prepared by frothing microcellularly frothable polyurethane reactive ingredients, generally supplied as at least two reactive component streams: a resin stream containing an isocyanate-reactive polyol mixture, and an isocyanate stream containing one or more frothable di- and/or polyisocyanate prepolymers, quasi-prepolymers, or mixtures thereof, optionally together with one or more di- or polyisocyanates.

The resin side (B-side) contains minimally one or more isocyanate-reactive polyols and/or polymer polyols and preferably a chain extender. Optional components include catalysts, cross-linkers, pigments, fillers and other conventional additives. A frothing surfactant must also generally be present. Suitable isocyanate-reactive polyols are low unsaturation polyoxypropylene polyols having equivalent weights in the range of 1000 Da to 6,000 Da, preferably 1500 Da to 5,000 Da, and more preferably 1500 Da to 3,000 Da. The unsaturation of these polyols must be below 0.015 meq/g, preferably lower than 0.010 meq/g, and most preferably about 0.007 meq/g or less. Molecular weights and equivalent weights herein in Da (Daltons) are number average equivalent and molecular weights unless indicated otherwise. Polyols suitable include polyoxyalkylene polyols having nominal functionalities of from about 2 to about 8. By "nominal functionality" is meant the theoretical functionality, i.e. the functionality of the initiator molecule used to prepare the polyol. Blends of polyoxyalkylene polyols are generally used, with preference being given to average functionalities in the range of 2 to about 4 and average equivalent weights greater than about 1000 Da.

The polyoxyalkylene polyols are preferably polyoxypropylene homopolymer polyols, or polyoxypropylene polyols containing up to about 30 weight percent oxyethylene moieties, these oxyethylene moieties being randomly dispersed within the polymer chain, or located at the ends of the polymer chain as a polyoxyethylene cap. Polyols with both internal (random and/or block) oxyethylene moieties and external oxyethylene blocks (capped) polyols are also useful. Polyols of higher alkylene oxides, i.e. 1,2-butylene oxide or 2,3-butylene oxide, oxetane, or tetrahydrofuran are also useful, when used in conjunction with the low unsaturation polyoxypropylene polyols of the subject invention. Polyester polyols are also useful as minor components in the practice of the subject invention.

Preferred polyoxyalkylene polyether polyols are di- and trifunctional polyols prepared by oxyalkylating di-functional initiators such as propylene glycol, dipropylene glycol, ethylene glycol, diethylene glycol, 1,4-butanediol, and the like, or tri-functional initiators such as glycerine and trimethylolpropane. These are non-limiting examples of initiators. Polyols having low unsaturation, i.e. in the range of 0.012 to 0.020 meq/g measured by ASTM D-2849-69, "TESTING OF URETHANE FOAM POLYOL RAW MATERIALS", may be prepared with double metal cyanide complex catalysts such as those disclosed in U.S. Pat. Nos. 5,158,922; 5,470,813; 5,482,908; and 5,545,601.

However, most preferred are ultra-low unsaturation polyoxyalkylene polyols having levels of unsaturation less than about 0.010 meq/g, and generally in the range of 0.003 to 0.007 meq/g, whose synthesis is made possible by highly active DMC catalysts as taught in U.S. Pat. Nos. 5,470,812, 5,482,908, 5,545,601, and 5,689,012.

Batch and continuous processes employing such catalysts are disclosed in copending U.S. application Ser. No. 08/597,781 and U.S. Pat. No. 5,689,012. Such polyoxyalkylene polyether polyols are commercially available as ACCLAIM™ polyols from the ARCO Chemical Company. The foregoing patents are incorporated herein by reference.

Also suitable for use in the subject foams are polymer polyols. Polymer polyols are polyoxyalkylene polyols, polyester polyols, or other base polyols containing a finely dispersed solid polymer phase. Polymers having solid phases derived from the reactions of isocyanates with a variety of reactive species such as di-and tri-alkanolamines ("PIPA polyols"), hydrazine ("PHD polyols") and others, including polyurea ("PUD") and polyisocyanate ("PID") dispersions may be used. However, the preferred polymer polyols are the vinyl polymer polyols which may be prepared by the in situ polymerization of one or more vinyl monomers in the presence of a suitable vinyl polymerization initiator. Preferred vinyl monomers include, but are not limited to, styrene, acrylonitrile, α-methylstyrene, methylmethacrylate, and the like. Most preferred are acrylonitrile and styrene, optionally with minor proportions of other monomers. Solids content of the polymer polyols may range from about 5 weight percent to about 70 weight percent, with solids contents in the range of 20 weight percent to 50 weight percent preferred. The methods of preparation of the various polymer polyols are well known, and a great variety of such polyols are commercially available. Most preferably, the base polyols of the polymer polyols are low or ultra-low unsaturation polyoxyalkylene polyether polyols.

In addition to polyols and polymer polyols, the resin side (B-side) preferably contains minimally about 50 equivalent percent, based on the free isocyanate group content of the isocyanate side (A-side), of one or more low molecular weight chain extenders, preferably those having a molecular weight of less than 300 Da, more preferably less than about 150 Da. Suitable chain extenders include difunctional species such as ethylene glycol, diethylene and triethylene glycols, propylene glycol, dipropylene and tripropylene glycols, 1,3-propanediol, 1,4-butanediol, 2,2,4-trimethylpentanediol, 1,4-cyclohexanediol, 1,4-cyclohexanedimethanol, 1,6-hexanediol, and the like. Most preferred is 1,4-butanediol. Mixtures of chain extenders may be used.

The catalyst or catalysts is/are normally included in the resin side of the formulation. Conventional urethane-promoting catalysts such as the various tin catalysts, i.e. dibutylin dilaurate, dibutylin diacetate, tin octoate, and the like are suitable. Amine based catalysts such as diazbicyclooctane may also be used. When the preferred formulations containing substantially no water are employed, blowing catalysts which accelerate the water-isocyanate reaction, and which are ordinarily necessary for preparation of water blown microcellular polyurethane/urea elastomers are not required. When the formulation contains some water, as hereinafter described, a blowing catalyst such as diazabicyclo[2.2.2]octane or another catalyst which catalyzes the isocyanate/water reaction should also be included in the formulation. Catalyst types and amounts can be easily selected by one skilled in the art of microcellular polyurethane elastomers.

While preferred compositions according to the subject invention contain substantially no water, i.e. no water is purposefully added to the formulation to serve as a blowing agent, the resin side may contain a most minor amount of water as hereinafter defined. Polyurethane reactants often contain very minor amounts of water as supplied, particularly polyols, chain extenders, and crosslinkers. However, the amounts are so low that no observable blowing takes place, and without the addition of a reactive or non-reactive blowing or frothing agent, only non-cellular polyurethanes would result form their use.

In water blown microcellular polyurethane/urea foams, water is added in amounts from about 0.05 to about 0.5 parts water per 100 parts combined resin/isocyanate. These amounts may, for example, produce microcellular foams with densities ranging from about 0.8 g/cm$^3$ to about 0.2g/cm$^3$. In the present invention, the preferred all-polyurethane microcellular frothed foams may be produced in this same density range without incorporating any water as a blowing agent. The foams will contain substantially no urea groups. However, if minor amounts of urea groups may be tolerated for a specific application, then a most minor amount of water may be added as well. This "most minor" amount of water may be defined as 50 weight percent or less of the amount of water which would be necessary to provide a microcellular elastomer of the same density without frothing.

By way of illustration, if 0.1 part of water per 100 parts of the total elastomer system formulation would provide a microcellular elastomer having a target density of about 0.70 g/cm$^3$ in the absence of frothing, then a "most minor" amount of water in such a system would be about 0.05 part or less. The additional microcells and/or larger microcells required to produce the target density will be provided by frothing. The elastomer thus produced will have far fewer urea groups than the all-water-blown microcellular elastomer, and is thus expected to exhibit considerably different physical properties, in particular, higher elongation and tear strength. Such an elastomer, having a proportion of urea linkages considerably less than the amount contained in an all water-blown polyurethane/urea elastomer of similar density, is still considered a polyurethane microcellular elastomer as that term is used herein, and not a polyurethane/urea elastomer.

While the isocyanate-reactive components have been described as the "B-side" or "resin side" heretofore, this terminology should not be interpreted to mean that the isocyanate reactive components need be blended into a single component. While this is certainly possible, and may be preferable in some cases, it is likely that in high throughput manufacturing, the various resin side components may be delivered to a multiple port mixing head such as those supplied by Henneke, Kraus-Maffei, and other manufacturers. The combined streams of the resin side may then be frothed and combined with the A-side froth, or the A-side (isocyanate components, together or separate) may be added as separate streams along with the B-side components and frothed.

The isocyanate component used to form the isocyanate-terminated prepolymers and quasi-prepolymers may be selected from the organic aliphatic and aromatic di- and poly-isocyanates useful in the preparation of polyurethane polymers. Non-limiting examples of suitable isocyanates include the aromatic isocyanates such as 2,4- and 2,6-toluene dissocyanate and mixtures thereof; the various methylene diphenylene disocyanates (MDI), including 2,2'-, 2,4'- and 4,4'-MDI and their various mixtures; modified aromatic isocyanates such as those prepared by reaction of isocyanates with themselves or with reactive low molecular weight or oligomeric species, particularly carbodiimide, uretdione, and urethane modified MDI; polymeric MDI; and the various a liphatic and cycloaliphatic isocyanates such as 1,6-hexane diisocyanate, 1,8-octane diisocyanate, 2,4- and 2,6-methylcyclohexane diisocyanate, 2,2'-, 2,4'- and 4,4'-dicyclohexylmethane diisocyanate, and isophorone diisocyanate. Modified aliphatic and cycloaliphatic isocyanates are also useful.

Preferably used are isocyanate-terminated prepolymers prepared by reaction of a stoichiometric excess of a di- or polyisocyanate with a polyoxyalkylene glycol or a mixture of one or more polyoxyalkylene glycols with higher functional oxyalkylated species. The average nominal functionality is preferably between about 2.0 and 2.2, and is most preferably about 2.0. Suitable glycols include polyoxypropylene glycols; polyoxypropylene glycols further containing up to about 30 weight percent oxyethylene moieties as an internal and/or external block and/or as random internal oxyethylene moieties; and polytetramethylene ether glycols (PTMEG). The polyoxyalkylene polyol component may contain minor amounts of polyester diols, polycaprolactone diols, and similar species. The isocyanate-reactive component preferably has a molecular weight of from about 1000 Da to about 15,000 Da, more preferably 1000 Da to 8000 Da, and most preferably about 2000 Da to 4000 Da. Most preferred are ultra-low unsaturation polyoxypropylene homopolymer glycols and ultra-low unsaturation polyoxypropylene/polyoxyethylene copolymer glycols containing random internal oxyethylene moieties, these latter preferably prepared by DMC catalysis as previously described.

The isocyanate-terminated prepolymers should have isocyanate group contents of between about 2 weight percent and 18 weight percent, preferably 4 weight percent to 12 weight percent, and most preferably about 6–10 weight percent. Low viscosity isocyanates, for example TDI and MDI may additionally be used in processes according to the subject invention where the individual components or separate A-and B-sides are first mixed and then frothed, provided of course, that the blend of polyols, low viscosity isocyanates, chain extenders and the like is of frothable viscosity such that a stable, non-collapsing froth may be obtained. However, for elastomers having desirable physical properties, it is generally necessary to employ isocyanate-terminated prepolymers. In the embodiment of the subject invention wherein the A-side and B-sides are separately frothed, the A-side isocyanate component must itself have a frothable viscosity. For this reason, isocyanate-terminated prepolymers are particularly appropriate, although isocyanates of frothable viscosity may be prepared by adding viscosifiers to lower viscosity di- or polyisocyanates, quasi-prepolymers, or low viscosity prepolymers.

The frothing, whether as a combined stream or as separate streams, must generally take place in the presence of a suitable frothing surfactant. Such surfactants are available from OSI, Inc. One such surfactant is VAX6123 surfactant. Other surfactants may be useful as well. It may be possible that a particular component or side may be frothed without addition of a frothing surfactant. The term "microcellularly frothable" with respect to a complete system, system A or B-side, or system component, indicates that the respective system, side, or component may be frothable to a stable, non-collapsing froth of suitable density and cell size for molding a microcellular elastomer part. Such "microcellular frothable" components will generally include one or more frothing surfactants.

It was surprising that the frothed microcellular foams of the subject invention exhibited less variation in physical properties, as reflected by the differences in overall density, and core density as compared to water-blown microcellular elastomers. This is particularly unexpected in view of the tendency of conventional frothed foams (not microcellular) to readily collapse. However, most surprising was the fact that A-side and B-side components could be separately frothed, the froths combined, and molded to form a fully cured microcellular polyurethane elastomer having excellent physical properties.

In addition to the reactive components as described heretofore, the formulation may contain other conventional additives and auxiliaries, e.g. dyes, pigments, plasticizers, fillers, and the like. These components are present in most minor quantities, and when present, should not be taken into account when calculating or measuring microcellular foam density.

The frothed reactive formulation is introduced into a suitable mold and generally heated until the elastomer has developed enough green strength to allow demold. For example, molds may be conventionally preheated to 50° C., the frothable mixture introduced, and the mold maintained in a 50° C. oven until cured. The foam is generally introduced into the mold at positive pressure. A positive pressure ensures that the mold cavity is completely filled and a void-free part produced.

By the term "permanent, non-organic gas(es)" is meant a substance which is a gas at standard temperature and pressure, is not a hydrocarbon or halocarbon, and has been incorporated as a gas, not generated by chemical reaction. Preferred permanent gases are nitrogen, air, and carbon dioxide, or mixtures thereof. The term should not be construed as requiring complete absence of organic blowing agents, as minor amounts of such blowing agents may be added without causing substantial change in physical properties and therefore would not depart from the spirit of the invention. Amounts of organic blowing agents must be less than 20 weight percent of the calculated amount of blowing agent necessary to prepare a non-frothed, blown foam of similar density to meet the above definition. Preferably, no organic blowing agent is used. A substantial portion, and preferably all of the gases contained in the cells should be introduced by frothing, and/or by addition of water in minor amount. Preferably, at least 50% of the gases are air, nitrogen, carbon dioxide introduced by frothing, or their mixtures, with or without non-condensable (0° C. or above) water vapor. More preferably, this gas mixture comprises 70%, and most preferably 90% or more of total gas contained in the microcells.

Having generally described this invention, a further understanding can be obtained by reference to certain specific examples which are provided herein for purposes of illustration only and are not intended to be limiting unless otherwise specified.

EXAMPLES 1 and 2

Microcellular elastomers were prepared according to the following procedure:

The formulations presented in Table 1 were frothed using a wirewhip mixer. The resulting froth had a density of 0.67 g/cm³.

TABLE 1

| COMPONENT (B-side) | EXAMPLE 1 | EXAMPLE 2 |
|---|---|---|
| Polyol A[1] | 63.53 | 66.07 |
| Polyol B[2] | 42.89 | 44.60 |
| 1,4-Butanediol | 16.526 | 17.187 |
| Catalyst Package | 1.34 | 1.41 |
| UAX6123 Frothing surfactant | 1.34 | 1.517 |

[1]Polyol A is a KOH catalyzed, glycerine-initiated polyoxypropylene triol having a 19% by weight polyoxyethylene cap and a hydroxyl number of 35.
[2]Polyol B is a polymer polyol based on Polyol A, containing nominally 40 weight percent acrylonitrile/styrene solids.

Separately, prepolymer compositions prepared by previously reacting the components shown in Table 1a were frothed using a wirewhip mixer. The resulting prepolymer froths had the densities expressed in Table 1a.

TABLE 1a

| COMPONENT | EXAMPLE 1 | EXAMPLE 2 |
|---|---|---|
| 4000 Da diol polyol (unsat < 0.007 meq/g) | 68.372 | 77.509 |
| MDI | 55.614 | 63.046 |
| Carbodiimide modified MDI | 9.814 | 11.126 |
| Density (frothed)(g/cm³) | 0.44 | 0.25 |

The froths from Tables 1 and 1a were whipped together and poured into a 50° C. mold, and allowed to cure. Froth and elastomer densities and other elastomer physical properties are reported in Table 2 below.

TABLE 2

| | EXAMPLE 1 | EXAMPLE 2 |
|---|---|---|
| Froth density, g/cm³, A-side | 0.44 | 0.25 |
| Froth density, g/cm³, B-side | 0.67 | 0.67 |
| Elastomer Density, g/cc | 0.50 | 0.26* |
| Resiliency, % | 46 | 41 |
| Tensile strength, psi | 288 | 150 |
| Hardness, Asker C | 75 | 45 |
| C Tear, lb/in | 65.7 | 33 |
| Split Tear, lb/in | 23.1 | 8.2 |

*A small amount of moisture was trapped into the sample due to the humidity in the room. This resulted in a lower density elastomer than was predicted.

COMPARATIVE EXAMPLE C1

A comparative polyurethane/urea elastomer was prepared from a similar formulation but containing sufficient water to provide a water-blown microcellular elastomer having a density of 0.49 g/cm³ (target density 0.50 g/cm³)

One of the advantages of a urea group-free microcellular elastomer is improved tear strength. Tear is one of the most important properties in footwear applications: The following table compares the tear properties of water blown and air blown (frothed) microcellular elastomers:

TABLE 3

| COMPONENT | EXAMPLE 1 | COMPARATIVE EXAMPLE 1 |
|---|---|---|
| Blowing Agent | Air | Water |
| Density, g/cc | 0.50 | 0.49 |

TABLE 3-continued

| COMPONENT | EXAMPLE 1 | COMPARATIVE EXAMPLE 1 |
|---|---|---|
| Split Tear, lb/in | 23.1 | 15.8 |
| C Tear, lb/in | 65.7 | 50.7 |

As illustrated in Table 3, the microcellular polyurethane elastomers prepared by frothing exhibited a 46% improvement in split tear, and a 30% improvement in C tear as compared to a water-blown microcellular polyurethane/urea foam of the same density. The polymer polyols used in the B-side of the Example 1 and 2 formulations contained conventionally catalyzed polyoxypropylene/polyoxyethylene base polyols.

EXAMPLE 3

A froth formulation was prepared by adding to a mixing bowl 48.61 g of a 7% NCO prepolymer prepared from 4,4'-MDI and an ultra-low unsaturation polyoxypropylene/polyoxyethylene diol having a molecular weight of c.a. 4000 Da; 121.5 g of a 7% NCO prepolymer prepared from 4,4'-MDI and a c.a. 6000 Da ultra-low unsaturation polyoxypropylene triol; 42.4 g butanediol; and 6.1 g VAX 6123 frothing surfactant.

The prepolymers, prepared using ultra-low unsaturation polyols, were added to a mixing bowl along with the chain extender and frothing surfactant. These were mixed for 30 seconds, following which the catalysts (0.19 g BL 11, 0.16 g NIAX® 33LV) were added and mixing continued with a whip for 60 seconds. The resulting froth was poured into an 8"×6"×1" (20.3 cm×15.2 cm×2.5 cm) aluminum mold preheated to 50° C., and cured at 50° C. for 5 to 10 minutes.

EXAMPLE 4

A formulation was made, frothed, molded, and cured in a fashion identical to that of Example 3, and using an identical formulation, however initial mixing was shortened to 16 seconds and mixing after catalyst addition shortened to 30 seconds.

COMPARATIVE EXAMPLES C3 and C4

Elastomers were prepared from the same formulation as that used in Examples 3 and 4 except that water was used as a blowing agent to prepare water-blown microcellular foams having overall densities of 0.53 g/cm³ and 0.56 g/cm³ for comparison purposes. The physical characteristics of the frothed and water-blown foams are set froth in Table 4 below.

TABLE 4

| | Froth | Water | Froth | Water |
|---|---|---|---|---|
| Example | 3 | C3 | 4 | C4 |
| % polyol in Elastomer | 69.55 | 69.55 | 69.55 | 69.55 |
| % MDI in Elastomer | 23.93 | 23.93 | 23.93 | 23.93 |
| % 1,4-BDO in Elastomer | 6.52 | 6.32 | 6.52 | 6.32 |
| % Water in Elastomer | 0 | 0.2 | 0 | 0.2 |
| Overall density, g/cc | 0.53 | 0.53 | 0.56 | 0.56 |
| Core density, g/cc | 0.47 | 0.45 | 0.53 | 0.48 |
| Hardness, Asker C | 72 | 66 | 75 | 68 |
| Tensile Str., psi | 420.4 | 373.0 | 474.7 | 398.7 |
| % Elongation | 346.5 | 499.2 | 286.7 | 454.3 |

TABLE 4-continued

| Example | Froth 3 | Water C3 | Froth 4 | Water C4 |
|---|---|---|---|---|
| C Tear, pli | 111.3 | 85.3 | 121.7 | 91.2 |
| Split Tear, pli | 42.4 | 33.7 | 41.0 | — |
| 50% Comp. Set, % | 7.5 | 25.7 | 6.3 | 29.1 |
| Resiliency, % | 64 | 59 | 64 | 58 |

From the Table, it can be seen that the froth foams are more consistent, showing less difference between overall density and core density. In addition, the foams were unexpectedly harder and had higher tensile strengths as well. C tear and split tear were both markedly improved, resiliency was higher, and compression set dramatically decreased. In footwear applications, low compression set is highly important.

The properties of the foams set forth in the Table reveal some significant differences between frothed and water blown samples. It is believed that these differences may be due to differences in the hard segment composition. The frothed samples are 100% urethane, while the water blown samples are a mixture of urethane and urea.

In addition to the properties shown in the above Table, compression hysteresis techniques, which may be correlated with comfort factors in shoes, were tested. The test involves 5 repeated compressions at a known rate to 50% deformation of a sample. The following table shows results obtained on the fifth cycle at three rates, 5, 10, and 20 inches/minute. The materials tested are the same ones that are described in the previous table:

TABLE 5

| Example | Froth 3 | Water C3 | Froth 4 | Water C4 |
|---|---|---|---|---|
| Hysteresis | | | | |
| @5 in/min | 12.5 | 15.0 | 10.9 | 13.6 |
| @10 in/min | 10.5 | 14.5 | 9.7 | 12.4 |
| @20 in/min | 7.3 | 14.8 | 7.3 | 11.5 |
| Load/lb | | | | |
| @5 in/min | 164 | 116 | 215 | 133 |
| @21 in/min | 173 | 132 | 232 | 148 |
| @20 in/min | 195 | 141 | 253 | 157 |
| Strength/psi | | | | |
| @5 in/min | 165 | 118 | 214 | 135 |
| @10 in/min | 171 | 134 | 234 | 151 |
| @20 in/min | 194 | 144 | 256 | 162 |

The frothed system displays superior hysteresis and higher load bearing capacity as compared to the water-blown system.

EXAMPLE 5 AND COMPARATIVE EXAMPLE C5

Two similar elastomer formulations were used to prepared microcellular elastomers, and the physical properties of the elastomers compared. The first elastomer was frothed. Water was added to the second formulation to produce a water-blown polyurethane/urea microcellular elastomer. Both examples employ an ultra-low unsaturation diol-based isocyanate-terminated prepolymer prepared by reacting 2500 g Acclaim™ 4201, a 28 hydroxyl number polyoxyalkylene diol available from the ARCO Chemical Co., with 856.1 g Mondur® M (pure MDI). Both examples also employ an ultra-low unsaturation triol-based isocyanate-terminated prepolymer prepared by reacting 2500 g Acclaim™ 6300, a 28 hydroxyl number polyoxyalkylene triol also available from the ARCO Chemical Co., with 858.1 g Mondur® M. The formulation is given in Table 6a below.

TABLE 6a

| Components | Example 5 | Example C5 |
|---|---|---|
| A:B Ratio | 92:8 | 92:8 |
| % NCO in prepolymer | 7 | 7 |
| Diol prepolymer | 396.4 | 396.4 |
| Triol prepolymer | 98.9 | 99.1 |
| 1,4-butanediol | 34.5 | 33.5 |
| BL-11 | 0.15 | 0.27 |
| NIAX ® 33LV | 0.08 | 0.22 |
| UL-1 | 0.009 | 0.015 |
| UAX 6123 | 5 | 5 |
| Water | — | 1.06 |

The elastomer physical properties are listed in Table 6b below.

TABLE 6b

| Components | Example 5 | Example C5 |
|---|---|---|
| Density, g/cm$^3$ | 0.53 | 0.53 |
| Split tear, kg/cm | 7.6 | 6.0 |
| Hysteresis @ 5 in/min | 12.5 | 15 |
| Hysteresis @ 10 in/min | 10.5 | 14.5 |
| Hysteresis @ 20 in/min | 7.3 | 14.8 |
| Tensile strength, kg/cm$^2$ | 29.6 | 26.3 |
| % Elongation | 347 | 499 |
| Hardness, Asker C | 68 | 68 |
| Comp set, % | 7.5 | — |
| C tear, kg/cm | 19.9 | 15.3 |
| Resiliency | 64 | 59 |

EXAMPLE 6 AND COMPARATIVE EXAMPLE C6

Two frothable formulations were prepared, frothed, and cured in the same manner as Example 3. The Example 6 microcellular polyurethane elastomer was prepared from ACCLAIM® 4200 polyether polyol, a polyoxypropylene diol having a molecular weight of 4000 Da and an unsaturation of 0.005 meq/g. The Comparative Example C6 microcellular polyurethane elastomer was prepared from a polyoxypropylene diol having a molecular weight of 4000 Da but a higher unsaturation in the conventional range, c.a. 0.08 meq/g. The results are set forth in Table 7 below.

TABLE 7

| Elastomer From | Acclaim 4200 | ARCOL PPG4025 |
|---|---|---|
| Density | 0.47 | 0.47 |
| Tensile Strength, psi | 280 | 190 |
| % Elongation | 210 | 180 |
| Resiliency | 46 | 43 |
| % Compression Set | 11 | 25 |
| C tear | 60 | 52 |
| Hardness, Asker C | 46 | 46 |

By the term "unfilled density" is meant the density which the foam would have free of filler, when used. Molecular weights and equivalent weights are number average molecular weights and equivalent weights in Daltons (Da). By the term "major" is meant 50% or more. By the term "minor" is meant less than 50%, these percents being percents by weight unless otherwise indicated. Each component disclosed herein may be used to the exclusion of components not necessary to the achievement of the objects of the invention, and in particular may be used to the exclusion of components and processes not described herein. Necessary components include an isocyanate component and an isocyanate-reactive component, at least one of these being prepared from a low or ultra-low unsaturation polyol such that the latter comprises at least 35 weight percent, and preferably a major part of the total polyoxyalkylene polyol component of the formulation, whether present as an isocyanate-reactive polyol or incorporated in an isocyanate-terminated prepolymer or quasi-prepolymer.

Having now fully described the invention, it will be apparent to one of ordinary skill in the art that many changes and modifications can be made thereto without departing from the spirit or scope of the invention as set forth herein.

What is claimed is:

1. A microcellular polyurethane elastomer having a density between about 0.2 g/cm$^3$ and 0.8 g/cm$^3$ having microcells filled with one or more permanent, non-organic gas(es), said elastomer prepared by frothing at least one isocyanate-terminated polyoxyalkylene prepolymer prepared by reacting a stoichiometric excess of one or more di- or polyisocyanates with a polyoxyalkylene polyol component having an average equivalent weight greater than about 1000 Da, and at least one polyoxyalkylene polyol composition, said polyoxyalkylene polyol composition having an average equivalent weight of at least about 1000 Da, an average functionality of about 2.0 or more, and optionally in addition to said polyol composition, 50 equivalent percent or more based on reactive isocyanate groups of an aliphatic glycol chain extender having a molecular weight below 300 Da to prepare a curable froth, and introducing said froth into a mold and allowing said froth to cure, wherein polyoxyalkylene polyols having unsaturation lower than 0.015 meq/g comprise minimally 35 weight percent of total polyoxyalkylene polyol in said polyoxyalkylene polyol component and said polyoxyalkylene polyol composition taken together.

2. The elastomer of claim 1 wherein all or a portion of isocyanate reactive components are frothed to form a first froth, and an isocyanate-terminated prepolymer-containing composition is frothed to form a second froth, said first and second froths combined to form said curable froth.

3. The elastomer of claim 1 wherein all reactive ingredients are intensively mixed and frothed together to form said curable froth.

4. The elastomer of claim 1 wherein said isocyanate-terminated prepolymer comprises one or more microcellularly frothable isocyanate-terminated prepolymer(s) prepared from one or more polyoxyalkylene polyethers having an average functionality of between about 2 and about 4.

5. The elastomer of claim 4 wherein at least one of said isocyanate-terminated prepolymer(s) is one prepared by the reaction of a stoichiometric excess of one or more di- or polyisocyanates with one or more low unsaturation polyoxypropylene polyols having an unsaturation of less than about 0.010 meq/g.

6. The elastomer of claim 5 wherein said polyoxypropylene polyol contains oxyethylene moieties in an amount of up to about 30 weight percent.

7. The elastomer of claim 6 wherein said oxyethylene moieties are random, internal oxyethylene moieties.

8. The elastomer of claim 1 wherein urea groups are present in said polyurethane microcellular elastomer, said urea groups produced through the reaction of free isocyanate groups with water added as an auxiliary blowing agent, said water being not more than about 50 percent by weight of the amount of water required to produce a foam of identical density without frothing.

9. The microcellular. elastomer of claim 1 wherein said permanent, non-organic gas(es) consist essentially of one or more of nitrogen, air, and carbon dioxide.

10. The elastomer of claim 1 wherein the density of said microcellular elastomer is from about 0.25 g/cm$^3$ to about 0.5 g/cm$^3$.

11. The microcellular elastomer of claim 1 having substantially no urea linkages formed by a water/isocyanate reaction.

12. A process for the preparation of a permanent, non-organic gas-frothed polyurethane microcellular elastomer having a density of from about 0.2 g/cm$^3$ to about 0.8 g/cm$^3$, said process comprising:
    a) frothing a first frothable mixture comprising one or more isocyanate-reactive components comprising one or more polyoxyalkylene polyols with a permanent, non-organic gas to form a first froth;
    b) frothing a second frothable mixture containing one or more isocyanate-terminated prepolymers having an average isocyanate group content from about 2 weight percent to about 18 weight percent, with a permanent, non-organic gas to form a second froth, said isocyanate-terminated prepolymer prepared by reacting a stoichiometric excess of one or more di- or polyisocyanates with a polyoxyalkylene polyol component, the total polyoxyalkylene polyol in said isocyanate-reactive component and said isocyanate-terminated prepolymer taken together comprising about 35 weight percent or more of one or more low unsaturation polyols having a functionality of from about 2 to about 8, an equivalent weight of about 1000 Da or higher, and an unsaturation of less than about 0.015 meq/g;
    c) combining said first froth and said second froth to form a curable froth;
    d) introducing said curable froth into a mold and allowing said curable froth to cure;
    e) removing a microcellular polyurethane elastomer from said mold.

13. The process of claim 12 wherein said first frothable mixture further comprises at least about 50 equivalent percent based on the amount of free isocyanate employed in said process of one or more aliphatic chain extenders having a molecular weight below about 300 Da.

14. The process of claim 12 wherein said low unsaturation polyols have an average unsaturation of less than about 0.010 meq/g.

15. The process of claim 12 wherein said isocyanate-reactive components have an average unsaturation of less than about 0.010 meq/g.

16. A process for the preparation of a permanent, non-organic gas-frothed polyurethane microcellular elastomer having a low urea-group content, said process comprising:
    a) selecting as an isocyanate component an isocyanate component consisting essentially of one or more isocyanate-terminated prepolymers or quasi-prepolymers, said isocyanate-terminated prepolymer or quasi-prepolymer prepared by reacting a stoichiometric excess of one or more di- or polyisocyanates with a polyol component, said polyol component comprising in major part one or more low unsaturation polyols having a functionality of from about 2 to about 8, an equivalent weight of about 1000 Da or higher, and an unsaturation of less than about 0.015 meq/g;

b) selecting an isocyanate-reactive component comprising one or more polyoxyalkylene polyols having a nominal functionality of from about 2 to about 3 and at least about 50 equivalent percent based on reactive isocyanate groups of component (a) of one or more glycol chain extenders having a molecular weight below about 300 Da, such that the average nominal functionality of component (b) is from about 2.0 to about 2.3, said isocyanate-reactive component supplied as a single component or as multiple components;

c) frothing said (a) and (b) components to form a stable, curable froth at an isocyanate index of from about 90 to about 110 by incorporating an amount of one or more permanent, non-organic gases into components (a) and (b) such that following curing a microcellular foam having a density of from about 0.2 g/cm$^3$ to about 0.8 g/cm is obtained;

d) introducing said curable froth into a mold; and e) curing said froth to form a microcellular polyurethane elastomer.

17. The process of claim 16 wherein said frothing takes place in the presence of an effective amount of one or more froth-stabilizing surfactants.

18. The process of claim 16 wherein said components (b) further comprise a minor amount of water, said minor amount of water being less than 50% by weight of the amount of water which would be effective to form a microcellular elastomer having the same density of said non-permanent gas-frothed elastomer but without frothing.

19. The process of claim 16 wherein said isocyanate component consists essentially of one or more isocyanate terminated prepolymers, each of said prepolymers prepared by reaction of MDI, modified MDI, or mixtures thereof, with one or more low unsaturation polyoxypropylene polyols, said polyoxypropylene polyols containing not more than about 30 weight percent oxyethylene moieties, said polyoxypropylene polyols having number average molecular weights between about 1000 Da and 5,000 Da, and an average unsaturation of less than about 0.015 meq/g.

20. The process of claim 19 wherein said average unsaturation is less than about 0.010 meq/g.

21. The microcellular elastomer of claim 1 wherein the major portion of total polyoxyalkylene polyols comprises one or more polyoxypropylene polyols having an unsaturation of less than 0.015 meq/g.

22. The microcellular elastomer of claim 1 wherein the major portion of total polyoxyalkylene polyols comprises one or more polyoxypropylene polyols having an unsaturation of less than 0.010 meq/g.

23. The microcellular elastomer of claim 1 wherein all polyoxyalkylene polyols having equivalent weights greater than 1000 Da have unsaturation less than 0.015 meq/g.

24. The process of claim 12 wherein the major portion of total polyoxyalkylene polyols comprises one or more polyoxypropylene polyols having an unsaturation of less than 0.015 meq/g.

25. The process of claim 12 wherein the major portion of total polyoxyalkylene polyols comprises one or more polyoxypropylene polyols having an unsaturation of less than 0.010 meq/g.

26. The process of claim 12 wherein all polyoxyalkylene polyols having equivalent weights greater than 1000 Da have unsaturation less than 0.015 meq/g.

* * * * *